Oct. 5, 1937.     C. A. SIOROS     2,095,088
DECORATIVE DUMMY DISPLAY TRUCK FOR FROZEN DESERTS
Filed Feb. 26, 1937
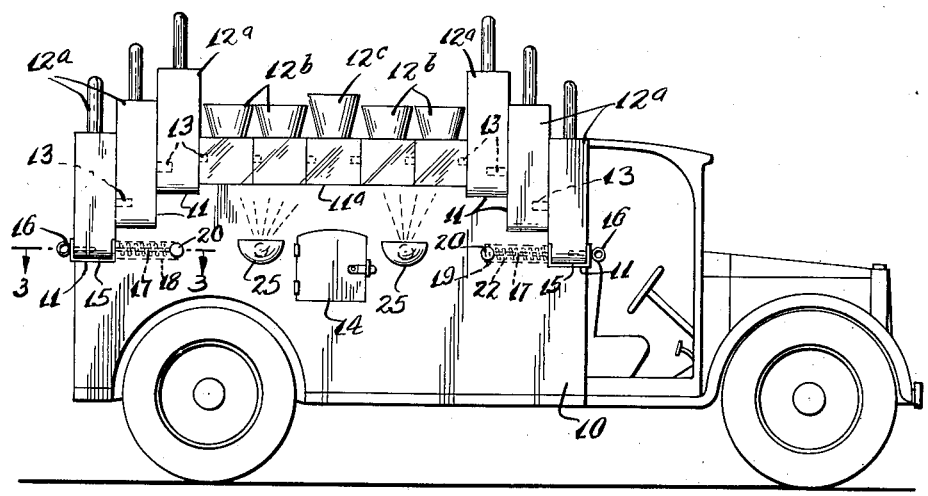
Fig. 1.
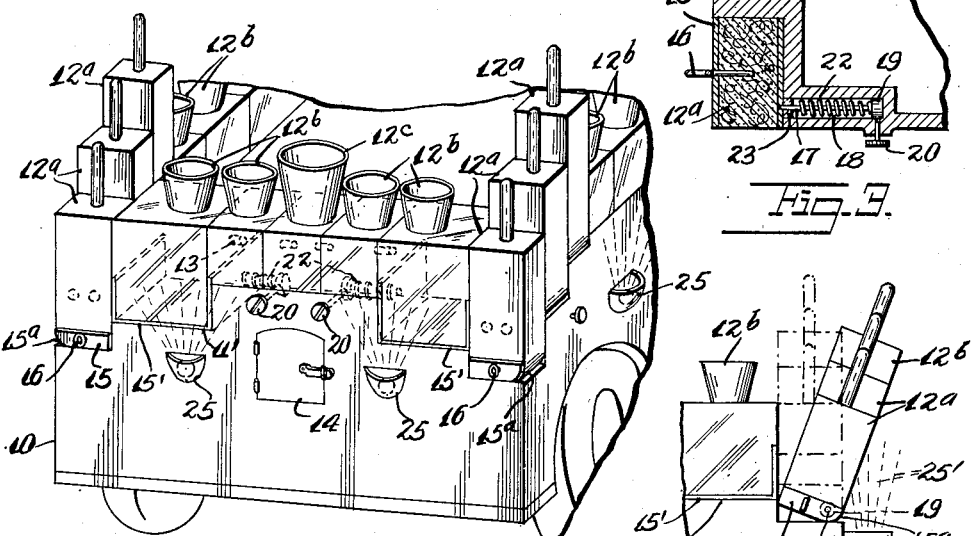
Fig. 2.
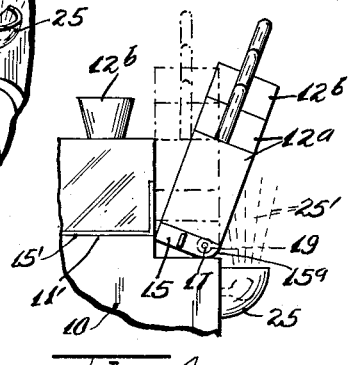
Fig. 3.
Fig. 4.
INVENTOR
CONSTANTINE A. SIOROS
BY
ATTORNEY Patented Oct. 5, 1937

2,095,088

UNITED STATES PATENT OFFICE 2,095,088

DECORATIVE DUMMY DISPLAY TRUCK FOR FROZEN DESSERTS

Constantine A. Sioros, Corona, N. Y.

Application February 26, 1937, Serial No. 128,038

4 Claims. (Cl. 40—126)

This invention relates to new and useful improvements in a decorative dummy display truck for frozen desserts.

The invention has for an object the construction of a truck body with a refrigerating section for the storage of frozen desserts, and a display section for the displaying of the wares of the truck.

More specifically, the invention contemplates arranging the truck body with several display sections, each consisting of a portion having steps at its ends and dummy display containers simulating articles sold by the vender on the truck mounted on said steps and along the top edge of said portion.

The invention proposes that the dummy display articles be ice cream lollipops, cups of ices, ice cream and similar wares.

Still further the invention proposes the provision of holders for the dummy displays on the outer lowermost steps, and means for resiliently urging said holders inwards and the arrangement of the other dummy display container adjacent each other and provided with inter-engaging pegs whereby they are held as a unit. The arrangement permits any one of the displays to be removed by merely separating them against the resilient action.

Still further the invention proposes provision of lamps for illuminating the displays.

Another one of the objects of this invention resides in a provision whereby the displays on each truck portion may be tilted outwards so as to be better illuminated by lamps arranged on the sides of the truck body.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a truck body constructed according to this invention.

Fig. 2 is a fragmentary rear perspective view of the body shown in Fig. 1.

Fig. 3 is an enlarged fragmentary sectional view taken on the line 3—3 of Fig. 1.

Fig. 4 is a fragmentary elevational view of a portion of the back part of the truck body.

The decorative dummy display truck for frozen desserts, according to this invention, comprises a truck body 10 having portions along the sides and across the back, each portion being of step formation.

With specific reference to the sides of the truck, each side is constructed as illustrated in Fig. 1. There are several steps 11 formed at the ends of the side. There is a central top portion 11$^a$ between the last steps. The steps are arranged so that the outermost steps of the portion are lowermost. Dummy displays 12$^a$, 12$^b$, 12$^c$, etc., are arranged on the steps and across the portion 11$^a$. Each of these dummies is separate and may be individually removed. Adjacent dummies are provided with pegs 13 on one of the dummies engaging receiving openings in the other of the dummies. The dummies 12$^b$ comprise cup portions simulating ice cream or ice cups mounted upon decorative base portions. It is these base portions which are provided with the inter-engaging pegs 13 and receiving openings. The dummies 12$^a$ represent ice cream on a stick. They are arranged progressively on the steps 11.

With specific reference to the back of the truck there is a body portion consisting of steps 11' at the ends of the portion between which there is an intermediate portion 11$^{aa}$. Dummy displays 12$^b$ and 12$^c$ are mounted upon removable blocks which in turn are set on the steps 11' and the section 11$^{aa}$.

Each of the side portions of the truck has holders 15 for the outer lowermost dummies 12$^a$. These holders 15 rest upon the outer lowermost steps 11. Each holder 15 is substantially of channel shape so that the lower portion of the dummy 12$^a$ may be forced into it. A removable pin 16 engages through one side of each holder and into the dummy 12$^a$ for holding it against accidental displacement. The inner side of each holder 15 near the outer face of the side of the truck is provided with a stem 17 which extends inwards into a cavity 18 in the truck wall. The inner end of each stem 17 is provided with a knurled head 19. Clamp screws 20 engage through bosses 21 on the side wall of the truck and engage against the knurled heads 19 for holding the knurled heads 19 in rotated positions when required. A spring 22 acts between each head 19 and each base wall 23 of each cavity 18 for urging each holder 15 inwards fully upon each step 11.

At the back wall of the truck there is a similar construction. Each step 11' is provided with a holder 15'. Each of these holders is adapted to receive and hold the end dummy display. Each of these holders is connected with a stem 17 which extends into a cavity 18. The stems have heads 19 engageable with screws 20. There are springs 22 for urging the stems inwards.

Normally, all of the displays are locked in their relative positions. When required the end holders 15 or 15' may be drawn outwards against the actions of the springs 22 to disengage the pegs from the receiving openings. It is then possible to individually remove the dummy display and replace or change them. Before the holders 15' may be extended to disengage the pegs between the adjacent dummy displays it is necessary that the dummy displays along the sides of the truck be pivoted outwards out of the way, or removed.

There are electric lights 25 mounted on the sides and the back of the truck for illuminating the various dummy displays. In order to better illuminate the dummy displays it is possible to tilt them outwards through a certain distance as shown in Fig. 4. To thus tilt the displays it is merely necessary to tilt the holders 15 or 15' as the case may be. The corners 15ª of the holders are curved using the stems 17 as centers so that pivoting is possible. In this respect see Fig. 4. Thus the holders 15 and 15' may be pivoted outwards and then locked in these positions by turning down the set screws 20. These set screws will then hold the heads 19 in the various turned positions, which in turn, through the medium of the stems 17, will hold the holders tilted. Examining Fig. 4 it will be noted that the rays 25' from the lamps 25 may better shine upon the dummies in their tilted positions.

It is to be understood that ice cream sandwiches and the like may also be displayed on this device and illuminated in any desired manner.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A decorative dummy display truck for frozen desserts comprising a truck body portion having steps at its ends, and dummy display containers simulating articles sold by the vender of the truck mounted on said steps and along the top edge of said portion, a holder for the dummy on the outer lowermost steps, each holder being provided with a stem extending into a cavity, resilient means for urging said stem inwards, and pegs between adjacent dummies for holding the dummies together as a unit when the stems are in their innermost positions.

2. A decorative dummy display truck for frozen desserts comprising a truck body portion having steps at its ends, and dummy display containers simulating articles sold by the vender of the truck mounted on said steps and along the top edge of said portion, a holder for the dummy on the outer lowermost steps, each holder being provided with a stem extending into a cavity, resilient means for urging said stem inwards, and pegs between adjacent dummies for holding the dummies together as a unit when the stems are in their innermost positions, and means for holding said stems in tilted positions to hold the dummy displays tilted outwards from the truck body.

3. A decorative dummy display truck for frozen desserts comprising a truck body portion having steps at its ends, and dummy display containers simulating articles sold by the vender of the truck mounted on said steps and along the top edge of said portion, a holder for the dummy on the outer lowermost steps, each holder being provided with a stem extending into a cavity, resilient means for urging said stem inwards, and pegs between adjacent dummies for holding the dummies together as a unit when the stems are in their innermost positions, and means for holding said stems in tilted positions to hold the dummy displays tilted outwards from the truck body, and lamps on the sides of the truck body for shining upon said dummy displays particularly when tilted outwards.

4. A decorative dummy display truck for frozen desserts comprising a truck body portion having steps at its ends, and dummy display containers simulating articles sold by the vender of the truck mounted on said steps and along the top edge of said portion, a holder for the dummy on the outer lowermost steps, each holder being provided with a stem extending into a cavity, resilient means for urging said stem inwards, and pegs between adjacent dummies for holding the dummies together as a unit when the stems are in their innermost positions, each of said holders comprising a channel shaped body into which the lower portion of a dummy may be forced, and a pin on said holder engaging into the dummy to assist in holding it in position.

CONSTANTINE A. SIOROS.